Patented Feb. 6, 1945

2,368,841

UNITED STATES PATENT OFFICE 2,368,841

PREPARATION OF SULPHONYL GUANYLUREAS

Donald W. Kaiser and Jack T. Thurston, Riverside, Conn., assignors to American Cyanamid Company, New York, N. Y., a corporation of Maine No Drawing. Application April 11, 1942, Serial No. 438,572

9 Claims. (Cl. 260—397.7)

This invention relates to a method for preparing sulphonyl guanylureas. More particularly it relates to a method of preparing aliphatic or aromatic sulphonyl guanylureas by a method which utilizes an aliphatic or aromatic sulphonyl dicyandiamide as an intermediate.

In the past it has been known that sulphonyl guanylureas could be prepared by reacting a sulphonyl halide with guanylurea. We have found that sulphonyl guanylureas can be prepared by an entirely different process utilizing relatively cheap starting materials which process results in excellent yields.

According to the present invention aliphatic or aromatic sulphonyl guanylureas are prepared by hydrolyzing the corresponding aliphatic or aromatic sulphonyl dicyandiamide. The hydrolysis may be carried out by subjecting the sulphonyl dicyandiamide to a refluxing or heat treatment in an aqueous medium. In many instances the hydrolysis may be carried out using water alone as the hydrolyzing medium. In other cases the hydrolyzing medium may comprise water in admixture with organic solvents, such as for example alcohol, dioxane, ethyl ether of ethylene glycol and the like. Similarly, an aqueous acidic hydrolyzing medium may be employed including those such as water-mineral acid solutions, suitable mineral acids being hydrochloric, sulphuric, sulphurous, nitric, phosphoric, and the like, or mixtures of water and organic acids, such as for example, acetic or formic, may be employed.

The aliphatic or aromatic sulphonyl dicyandiamides employed as intermediates in our process are claimed as new compounds in our co-pending application Serial No. 438,573 filed April 11, 1942.

The process of our invention will be described in greater detail in conjunction with the following specific examples which are typical illustrations, but it should be understood that the invention is not limited to the exact details set forth therein.

EXAMPLE 1

*Benzenesulphonyl guanylurea*

To 2.0 g. of benzenesulphonyl dicyandiamide was added a mixture of 50 g. of water and 10 g. of the ethyl ether of ethylene glycol. After refluxing the reaction mixture for 2.5 hours the solution was cooled and the colorless solid filtered and allowed to dry. The yield of benzenesulphonyl guanylurea melting with decomposition at 241°–242° C. was 1.8 g. or 80% of the theoretical.

EXAMPLE 2

*n-Butylsulphonyl guanylurea*

After mixing 20.4 g. of n-butylsulphonyl dicyandiamide, 10 g. of concentrated hydrochloric acid, and 20 g. of water followed by heating to reflux a mildly exothermic reaction occurred. When boiling had subsided, the solution was refluxed five minutes longer and cooled in an ice bath. The separated solid was broken up and the mixture was made alkaline with ammonia, the material was filtered, washed with water and air dried. n-Butylsulphonyl guanylurea melting with decomposition at 152°–154° C. was obtained in a yield of 18.5 g. or 83.4% of the theoretical. Crystallization from water gave colorless plates decomposing at 155°–156° C.

EXAMPLE 3

*Benzenesulphonyl guanylurea*

To a suspension of 27 g. of benzenesulphonyl dicyandiamide in 100 g. of water was added 18 g. of concentrated hydrochloric acid. After heating to reflux 300 g. of water and 10 g. of concentrated hydrochloric acid were added. After refluxing a short time addition of about 150 g. of the ethyl ether of ethylene glycol gave a clear solution. The solution was refluxed about ten minutes longer and on cooling benzenesulphonyl guanylurea began to separate. The mixture was made alkaline by addition of ammonia, the solid filtered, washed, and allowed to dry. The colorless solid, decomposing at 240°–241° C., weighed 23.8 g. which represented a yield of 81.5%. A portion, after crystallization from dilute ethyl ether of ethylene glycol, gave crystals decomposing at 243°–244° C.

EXAMPLE 4

*Sulphanilyl guanylurea*

To 60 g. of concentrated hydrochloric acid was added 28.1 g. of p-acetylaminobenzenesulphonyl dicyandiamide. Solution occurred with a slight evolution of heat. After heating to reflux the solution became reddish in color. Gentle refluxing was allowed to continue for fifteen minutes before the red colored solution was diluted with water, treated with darco, filtered and cooled. The light orange filtrate was made alkaline with ammonia and the slightly yellow solid filtered, washed with water and allowed to dry. The material decomposed at 203°–204° C. and weighed 11.2 g., which represented a yield of 43.3%. A portion after several crystallizations from hot water, with charcoaling, gave amorphous colorless solid which decomposed at 228°–229° C. on gradual heating in an oil bath. When a melting point tube was immersed at this temperature, decomposition occurred at 233°–234° C. which is the decomposition temperature recorded for this compound.

EXAMPLE 5

Sulphanilyl guanylurea

To a solution containing 7.4 grams of 95.5% sulphuric acid in 80 g. of water was added 20 g. of p-acetylaminobenzenesulphonyl dicyandiamide. After refluxing for fifteen minutes complete solution occurred, but heating was continued for a total of forty-five minutes. A small quantity of decolorizing charcoal was added, the solution filtered, and cooled in an ice bath which caused a small quantity of slightly gummy solid to separate. The mixture was well stirred and made faintly alkaline with ammonia water. The material solidified and a large quantity of additional solid separated from solution. The product was filtered, washed well with water and air-dried. The yield of colorless solid decomposing at 208°–210° C. was 86.5% of the theoretical.

The following examples will serve to illustrate methods for preparing the aliphatic or aromatic sulphonyl dicyandiamides employed as intermediates in the process of the present invention.

EXAMPLE A

Benzenesulfonyl dicyandiamide

To a stirred mixture of 99 g. of 85% potassium hydroxide, 100 g. of water, 58.8 g. of dicyandiamide and 120 g. of acetone, was gradually added at 15°–20° a solution of 88.25 g. of benzenesulfonyl chloride in 60 g. of acetone. After the addition was complete, the mixture was acidified with acetic acid, the colorless solid filtered, washed with a little methanol and the damp potassium salt of benzenesulphonyl dicyandiamide dissolved in about 700 g. of boiling water. The solution was filtered and cooled in an ice bath, causing crystals of the potassium salt to separate. The mixture was stirred and 50 g. of concentrated hydrochloric acid was added. After a short time the colorless solid was filtered, washed with a little water and allowed to dry. The yield of product melting at 174°–175° C. was 84 g. or 75% of the theoretical.

EXAMPLE B n-Butylsulphonyl dicyandiamide

To a solution of 198 g. of 85% potassium hydroxide in 200 g. of water was added 117.6 g. of dicyandiamide and 250 g. of acetone. The mixture was stirred and maintained at 15°–20° while a solution of 175 g. of crude n-butylsulphonyl halides, which was prepared from n-butylisothiourea hydrobromide and chlorine, was slowly added. After addition was complete, the mixture was acidified with acetic acid, the colorless solid filtered, washed with methanol, and allowed to dry. The crude potassium n-butylsulphonyl dicyandiamide decomposed at 255°–256° C. and weighed 132 g. which represented a 61% yield. The salt was dissolved in a minimum amount of hot water, filtered, cooled and acidified with 60 g. of concentrated hydrochloric acid. The colorless solid was filtered, washed with cold water and allowed to dry. The solid decomposed at 123°–124° C. and after recrystallization from hot water gave beautiful colorless plates, decomposing at 128°–129° C.

EXAMPLE C p-Acetylaminobenzenesulphonyl dicyandiamide

To a stirred mixture of 49.5 g. of 85% potassium hydroxide, 40 g. of water, 33.6 g. of dicyandiamide, and 60 g. of acetone was added at 20° a solution of 58.3 g. of p-acetylaminobenzenesulphonyl chloride in 120 g. of acetone. After the reaction was complete dilution with water failed to dissolve the solid but acidification with 50 g. of concentrated hydrochloric acid gave a light yellow solution which several minutes later deposited solid. The nearly colorless crystals, after filtration, washing with water, and drying, decomposed at 194°–196° C. and weighed 37.8 g. A portion crystallized from a mixture of water and the ethyl ether of ethylene glycol gave colorless crystals which decomposed at 195°–196° C. The acetylsulphanilyl dicyandiamide obtained may be readily hydrolyzed with alkali to sulphanilyl dicyandiamide.

In the foregoing examples the specific aliphatic and aromatic sulphonyl dicyandiamide employed may be replaced by various other aliphatic or aromatic sulphonyl dicyandiamides. Among such dicyandiamides may be included the primary aliphatic sulphonyl dicyandiamides, ethylsulphonyl dicyandiamide, hexylsulphonyl dicyandiamide, decylsulphonyl dicyandiamide, dodecylsulphonyl dicyandiamide, hexadecylsulphonyl dicyandiamide, octadecylsulphonyl dicyandiamide, 2-ethylhexylsulphonyl dicyandiamide, etc; the secondary aliphatic sulphonyl dicyandiamides, isopropylsulphonyl dicyandiamide, secondary butylsulphonyl dicyandiamide, secondary amylsulphonyl dicyandiamide, etc.; and the tertiary sulphonyl dicyandiamides, tertiary butylsulphonyl dicyandiamide, tertiary amylsulphonyl dicyandiamide, $\alpha,\alpha$-dimethylhexylsulphonyl dicyandiamide; the alicyclic sulphonyl dicyandiamides, cyclohexylsulphonyl dicyandiamide, cyclopentylsulphonyl dicyandiamide, cyclohexylmethylsulphonyl dicyandiamide, $\beta$-cyclohexylethylsulphonyl dicyandiamide, $\alpha$-cyclohexylpropylsulphonyl dicyandiamide, and those alicyclic compounds derived from petroleum. Among the aromatic sulphonyl dicyandiamides may be included those such as p-toluenesulphonyl dicyandiamide, p-carboxybenzenesulphonyl dicyandiamide, m-nitrobenzenesulphonyl dicyandiamide, o-brombenzenesulphonyl dicyandiamide, p-methoxybenzenesulphonyl dicyandiamide, $\alpha$-naphthalenesulphonyl dicyandiamide, $\beta$-naphthalenesulphonyl dicyandiamide, $\alpha$-5-sulphonaphthalenesulphonyl dicyandiamide, etc.

It is obvious that the above description and examples are intended to be illustrative only and that they may be varied or modified to a considerable extent without departing from the spirit of the invention or sacrificing the advantages thereof. We do not, therefore, intend to limit ourselves to the specific embodiments herein set forth except as indicated in the appended claims.

What we claim is:

1. The process of producing sulphonyl guanylureas which comprises hydrolyzing a substance of the group consisting of aliphatic sulphonyl dicyandiamides and aromatic sulphonyl dicyandiamides by subjecting to a heat treatment in the presence of an aqueous acidic solution, at a temperature below the decomposition point of the sulphonyl guanylurea produced.

2. The process of producing sulphonyl guanylureas which comprises hydrolyzing a substance of the group consisting of aliphatic sulphonyl dicyandiamides and aromatic sulphonyl dicyandiamides by subjecting to a heat treatment in the presence of an aqueous solution of hydrochloric acid, at a temperature below the decomposition point of the sulphonyl guanylurea produced.

3. The process of producing aliphatic sulphonyl guanylureas which comprises hydrolyzing an aliphatic sulphonyl dicyandiamide by subjecting to a heat treatment in the presence of an aqueous acidic solution, at a temperature below the decomposition point of the sulphonyl guanylurea produced.

4. The process of producing aliphatic sulphonyl guanylureas which comprises hydrolyzing an aliphatic sulphonyl dicyandiamide by subjecting to a heat treatment in the presence of an aqueous solution of hydrochloric acid, at a temperature below the decomposition point of the sulphonyl guanylurea produced.

5. The process of producing aromatic sulphonyl guanylureas which comprises hydrolyzing an aromatic sulphonyl dicyandiamide by subjecting to a heat treatment in the presence of an aqueous acidic solution, at a temperature below the decomposition point of the sulphonyl guanylurea produced.

6. The process of producing aromatic sulphonyl guanylureas which comprises hydrolyzing an aromatic sulphonyl dicyandiamide by subjecting to a heat treatment in the presence of an aqueous solution of hydrochloric acid, at a temperature below the decomposition point of the sulphonyl guanylurea produced.

7. The process of producing benzenesulphonyl guanylurea which comprises hydrolyzing benzenesulphonyl dicyandiamide by subjecting to heat treatment in the presence of an aqueous acidic medium, at a temperature below the decomposition point of the sulphonyl guanylurea produced.

8. The process of producing n-butylsulphonyl guanylurea which comprises hydrolyzing n-butylsulphonyl dicyandiamide by subjecting to heat treatment in the presence of an aqueous acidic medium, at a temperature below the decomposition point of the sulphonyl guanylurea produced.

9. The process of producing p-aminobenzenesulphonyl guanylurea which comprises hydrolyzing p-acetylaminobenzenesulphonyl dicyandiamide by subjecting to heat treatment in the presence of an aqueous acidic medium, at a temperature below the decomposition point of the sulphonyl guanylurea produced.

DONALD W. KAISER.
JACK T. THURSTON.